United States Patent [19]

Heide

[11] Patent Number: 4,645,171

[45] Date of Patent: Feb. 24, 1987

[54] HONEYCOMB TABLETOP

[75] Inventor: Ulf B. Heide, Marblehead, Mass.

[73] Assignee: Technical Manufacturing Corporation, Peabody, Mass.

[21] Appl. No.: 734,130

[22] Filed: May 15, 1985

[51] Int. Cl.$^4$ ............................................. F16M 11/00
[52] U.S. Cl. ...................................................... 248/637
[58] Field of Search ....................... 248/637, 346.1, 638, 248/672, 676; 108/24, 28; 211/60.1, 70.6, 74; 428/116

[56] References Cited

U.S. PATENT DOCUMENTS

| | | | |
|---|---|---|---|
| 3,176,662 | 4/1965 | Williams | 211/60.1 |
| 3,456,806 | 7/1969 | Borston | 211/60.1 |
| 3,601,343 | 8/1971 | Sivaslion | 248/637 |
| 3,836,416 | 9/1974 | Roprequet | 248/346.1 |
| 4,221,014 | 9/1980 | Davidson | 211/60.1 |
| 4,241,892 | 12/1980 | Morris | 248/346 |

FOREIGN PATENT DOCUMENTS 836401 4/1952 Fed. Rep. of Germany ........ 108/24

Primary Examiner—Reinaldo P. Machado
Assistant Examiner—Alvin Chin-Shue
Attorney, Agent, or Firm—Thompson, Gauthier, Samuels, Stevens & Kehoe

[57] ABSTRACT

A honeycomb tabletop for use with either a vibration isolation system or a rigid support stand. The tabletop has an upper skin, a lower skin, a connecting side wall, and a honeycomb core. Additional stiffening members and structural damping treatment may also, independently, be incorporated within the honeycomb core. The upper skin of the table has a plurality of tapped holes for mounting equipment. Each hole is sealed off from the interior of the table by a closed cavity enclosure which is secured to the underside of the top skin in registration with each hole. The cavity enclosures keep residue and contaminants from passing to the interior of the tabletop and facilitate cleanup of the tabletop. The enclosures are not subjected to any loads during use of the tapped holes in the top skin. The lower skin may optionally be perforated to prevent internal pressure buildup.

5 Claims, 4 Drawing Figures

HONEYCOMB TABLETOP

BACKGROUND OF THE INVENTION

This invention relates generally to laboratory tables and more particularly to honeycomb tabletops for use in supporting precision laboratory equipment.

Vibration isolation tables used for supporting highly sensitive equipment, such as optical and analytical devices, on a substantially vibration free surface are well known. Such systems generally include a tabletop comprising metallic upper and lower skins bonded to a honeycomb core and a connecting side wall. The upper skin of the tabletop typically contains a plurality of holes (usually drilled and tapped) which are used for securing equipment upon the tabletop surface. A honeycomb core with or without additional stiffening or damping components maintains a rigid separation between the skins and therefore the structural integrity of the top. These tabletops are commonly referred to as honeycomb tabletops. The tabletop is often supported by a vibration isolation system. An example of a vibration isolation system used with such a table would be the GIMBAL PISTON TM, isolation system described in U.S. Pat. No. 4,360,184.

The honeycomb tabletop is an efficient structure for providing an array of tapped holes while also meeting the needs of flatness (e.g. ±0.005 in), magnetic permeability for optional use of magnetic chucks, and reasonable weight.

The drawbacks to drilling through and then tapping the rather thin skin ($\frac{1}{8}$" or 3/16" typically) in such a table are that the tapped hole is backed by a large cavity extending the full depth of the table. Further, in processing the top, cutting or tapping oils must be used, leaving residues in the table that are incompatible with clean optical surfaces, clean room processes, and the like. The alternative to tapping, that is, to press in an open or closed threaded insert, is less desirable because of the likelihood that the threaded insert will loosen after repeated screw installations.

In addition to the contaminants encountered in the processing of the tabletop, the tapped holes provide an opening through which liquid or other debris spilled upon the table surface may pass into the interior. Such spillage may pass laterally from one honeycomb cell to another and will obviously contaminate the interior of a table. The tabletop cannot be thoroughly cleaned, since the bonded table cannot be disassembled and contamination can spread via vapors and seepage to a clean room atmostphere.

Thus, there is a need for a honeycomb tabletop which is constructed in such a way that contaminants and spillage may be easily contained, and prevented from entering the interior of the tabletop. Cleanup will be made easier and there will be a greatly reduced risk of serious contamination.

SUMMARY OF THE INVENTION

Broadly, the invention provides a honeycomb tabletop for use with or without a vibration isolation system which top is constructed in such a way that processing contaminants may be removed from the system during the manufacturing process. Further, the invention provides a tabletop wherein spillage may be easily cleaned from the table surface and spills will not enter the interior portion of the table.

In a preferred embodiment a honeycomb tabletop is formed wherein the holes are tapped in the upper skin. The skin is then cleaned. Subsequently, elongated cavity enclosures of minimal volume are secured to the underside of the top skin, each in registration with a tapped hole. With such cavity enclosures in place beneath each tapped hole, the table surface has the distinct advantage of containing any spillage which may occur with, for example, the use of laser cooling liquid, dyes, and the like. In the event of a spill, the liquid will not enter the interior portion of the table. Rather, it will be confined to the table surface and the shallow cavity enclosure. As a result, cleanup can be effectively accomplished by a combination of wiping the table surface and applying suction to the small enclosures. The enclosures must be affixed securely and permanently such as with discharge welding and/or epoxy, and must be put in place on the back of the top skin before the honeycomb table is layed up with its various components. These cavity enclosures will not become loose because they are not subjected to any loads resulting from normal use of the tapped holes. The fixed cavity enclosure array further affects table construction because the honeycomb cell must then fit around the cavities. This is preferable to the potential damage that occurs to the core when conventional drilling and tapping occur. Further, the entire top skin is processed and cleaned before lamination assembly, leaving a clean, oil and chip-free top skin.

DESCRIPTION OF THE PREFERRED EMBODIMENTS

Figure 1:
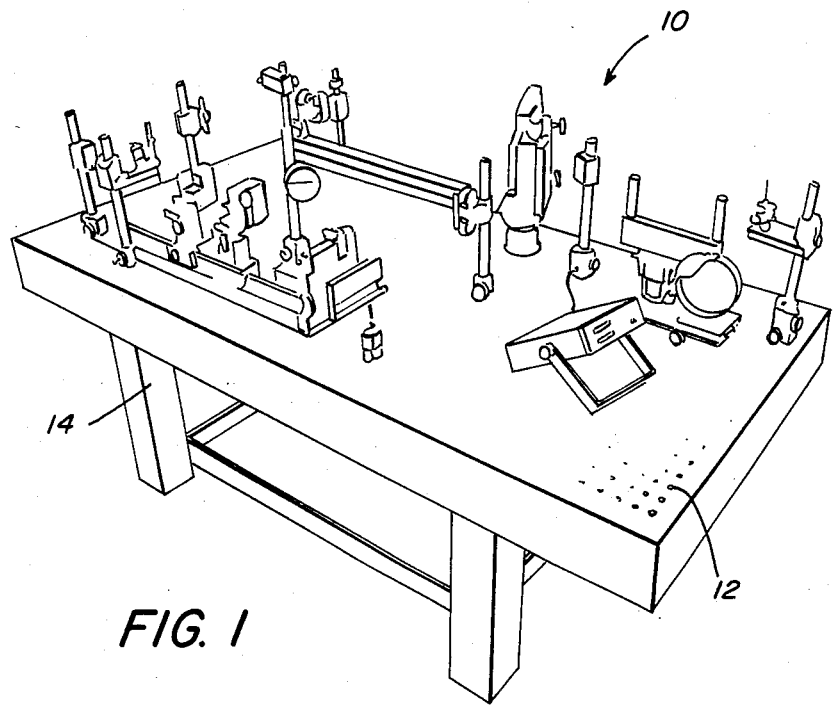
FIG. 1 is a perspective view of a vibration isolation system with a honeycomb tabletop.

As shown in FIG. 1, a vibration isolation table 10 is used to support laboratory equipment. The table consists of a rigid honeycomb tabletop 12, and a supporting vibration isolation system 14.

Figure 2:
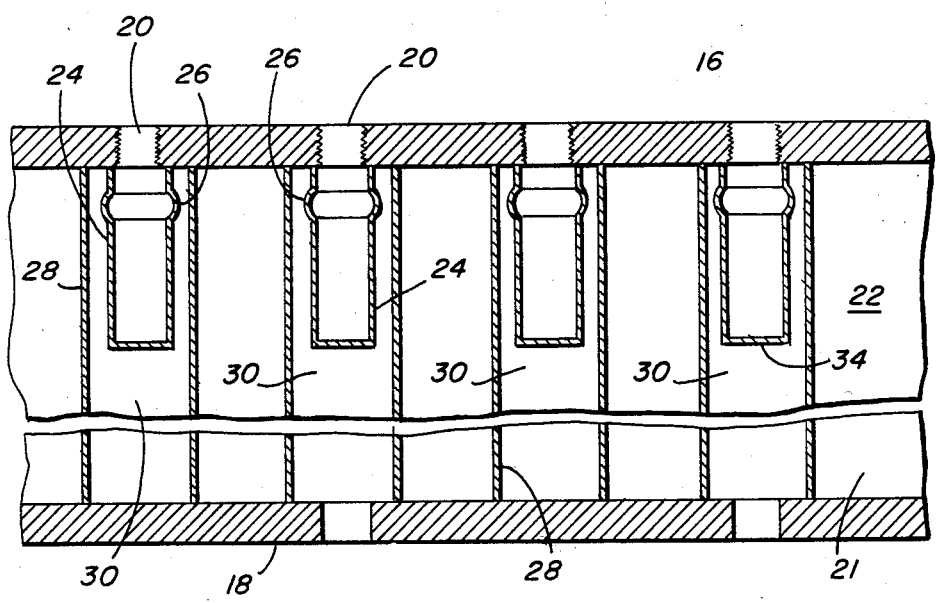
FIG. 2 is a side sectional view of the tabletop of FIG. 1.

Referring to FIG. 2, the tabletop of this invention includes an upper skin 16 having a plurality of tapped holes 20 used for mounting equipment upon the tabletop 12. The tabletop also has a lower skin 18 which, together with the top skin 16, defines an interior cavity 22. Within the interior cavity 22 are situated a plurality of metallic vertical members 28 which form a number of honeycomb cells 30. Additional internal damping material (not shown in this drawing) may be incorporated to aid in minimizing the vibrational products of normal tabletop flexural modes and other induced vibration.

Cavity enclosures 24 are secured, usually by welding, to the interior surface of the top skin 16. The enclosures 24 have a closed bottom portion 34 which prevents any liquid or other contaminant from entering the interior portion of the table. The tapped holes 20 and enclosures 24 are located so as to ensure that the enclosure 24 is situated substantially within the middle of the honeycomb cells 30. Also, the enclosure 24 has a shoulder portion 26 at its upper end, just below the top skin 16 which acts to prevent the metallic members from contacting the weld bead 32 which secures the enclosure 24 to the top skin 16.

Figure 3:
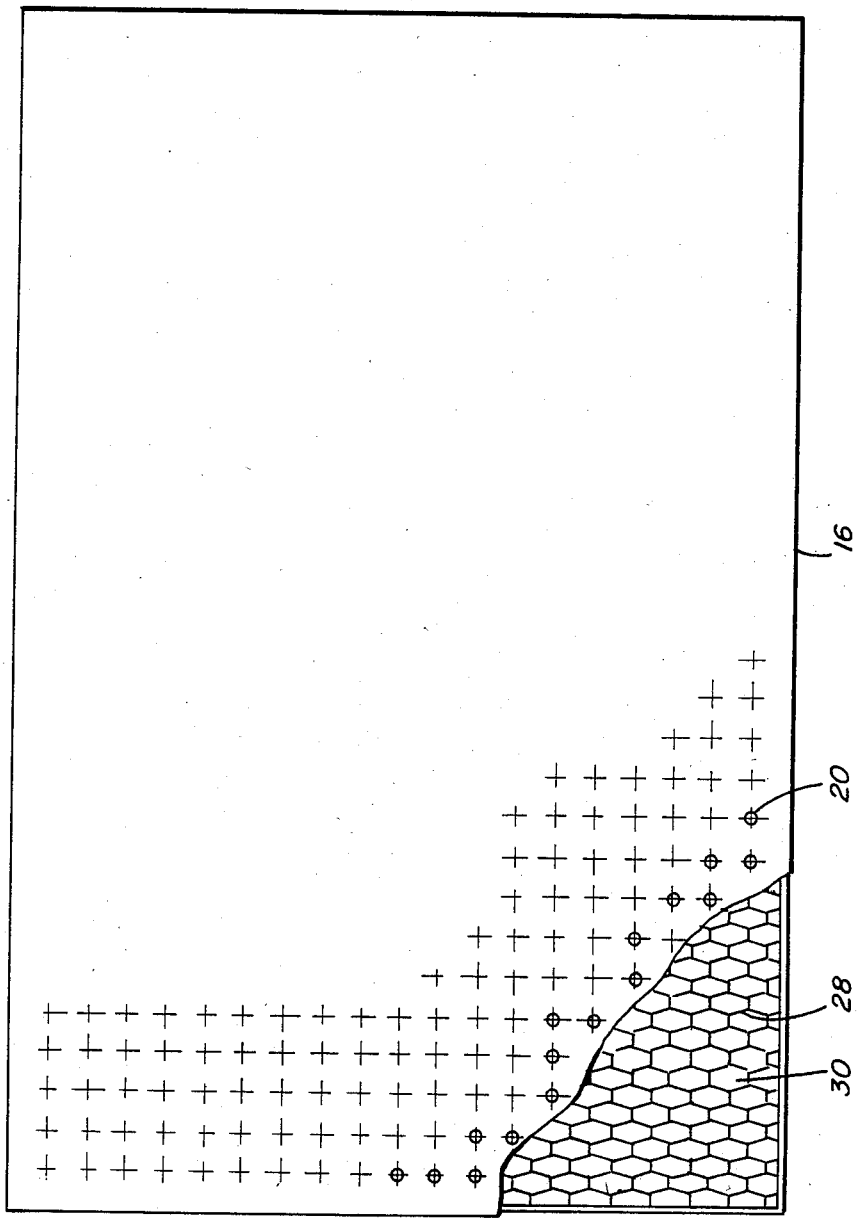
FIG. 3 is a plan view of the top surface and interior portion of the tabletop.

As best shown in FIG. 3, the metallic members 28 define closed honeycomb cells 30 which lie beneath top skin 16. The tapped holes 20 and enclosures 24 are situated so as to fall substantially in the center of the honeycomb cells 30.

Figure 4:
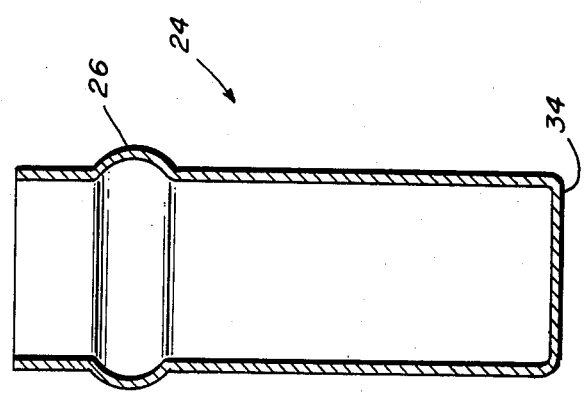
FIG. 4 is a side view of the closed cavity enclosure of this invention.

An enclosure 24, as shown in FIG. 4, is an elongate member generally constructed of metal or plastic, having the closed bottom portion 34 and the shoulder portion 26 situated just below its top end. The enclosure is dimensioned so as to be of relatively low volume. Ideally, the enclosure should be deep enough to allow some variation as to the depth to which a screw is seated and its width should generally be slightly greater than the width of the screw.

The cavity enclosures of the present invention may be adapted for use with any vibration isolation table system, or any other table or apparatus having a perforated surface where it is essential that liquid or other forms of contaminants be prevented from penetrating a top surface and entering an interior portion. Ideally, these cavity enclosures are used to close off tapped holes in the top skin of a tabletop. The enclosures prevent any debris produced during manufacturing, for example tapping oils and metal filings, and contaminants spilled while performing work on the table surface from entering the interior of the table. In the event that anything is spilled after the enclosures are in place, such a spill may be easily cleaned by simply wiping the table surface clean and applying suction to remove spillage from the cavities.

The process for assembling a tabletop having the cavity enclosures of this invention typically involves first drilling and tapping the mounting holes in the upper top skin. The skin is then cleaned. This is followed by the step of securing the enclosures to the underside of the upper skin, in registration with each tapped hole by a welding process or other method which will ensure permanent attachment. After thoroughly cleaning to leave an oil and dirt free surface the upper skin along with the attached enclosures, is coated with a polymeric adhesive/sealant, such as epoxy, urethane etc. The metallic members 28 are then pressed to the underside of the upper skin. This sealant acts to further ensure permanent attachment of the inserts to the top skin. The polymeric coating is then applied to the bottom skin which is joined to the members 28.

In an alternate embodiment of this invention, the table surface may be stiffened to a greater extent by adding horizontal stiffener plates to the internal damping system. These stiffener plates run vertically with the members 28 and will act to subdivide further the cells defined by the members 28.

It is understood that certain changes may be made in the foregoing description without departing from the scope of the invention. It is intended that all matter contained in the above description and depicted in the accompanying drawings be construed in an illustrative and not in a limiting sense.

What is claimed is:

1. A honeycomb table top comprising:
a stiffened and damped table surface having an upper skin with a plurality of tapped holes and a lower skin, and a side wall joining the upper and lower skins;
a plurality of plates disposed between the upper and lower skins, said plates defining a plurality of vertically orientated cells; and
a plurality of closed cavity non load bearing enclosures disposed below and affixed to the underside of the upper skin, and in registration with the tapped holes, some of said enclosures being received within at least some of said cells the enclosures being secured to the upper skin in a fluid-tight manner to seal off the top skin surface from the interior portion of the table top.

2. The tabletop of claim 1 wherein the enclosures are characterized by a shoulder intermediate the ends of the enclosure.

3. The tabletop of claim 1 wherein the enclosures are welded to the upper skin.

4. The tabletop of claim 1 which includes a seal-type coating on the underside of the upper skin.

5. The tabletop of claim 1 wherein the lower skin is characterized by perforations therein.

* * * * *